Feb. 28, 1928.
S. MUNSON
1,661,047
WINDSHIELD ADJUSTER FOR AUTOMOBILES
Filed May 7, 1927 2 Sheets-Sheet 1
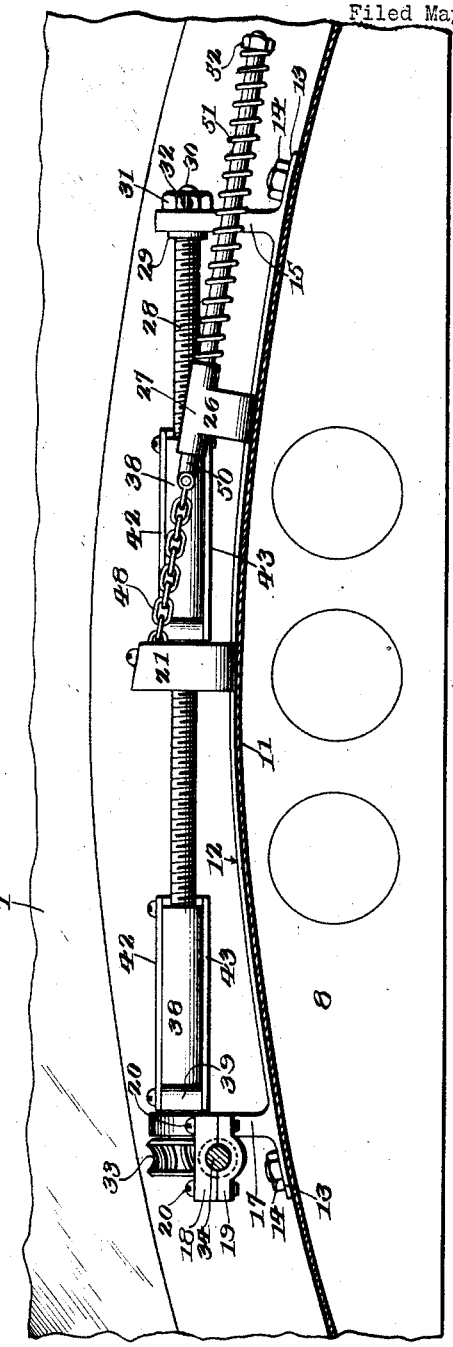
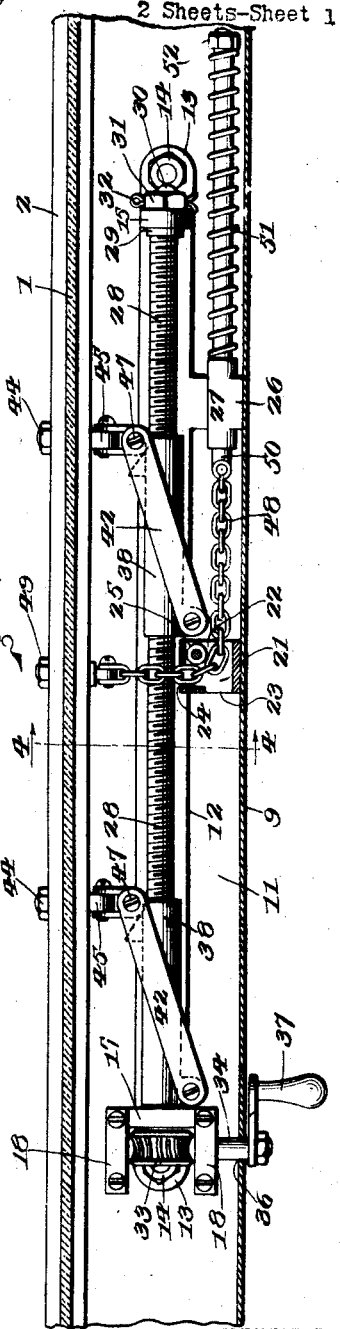
INVENTOR.
Sweney Munson,
BY Geo. F. Kimmel
ATTORNEY.

Feb. 28, 1928.
S. MUNSON
1,661,047
WINDSHIELD ADJUSTER FOR AUTOMOBILES
Filed May 7, 1927   2 Sheets-Sheet 2
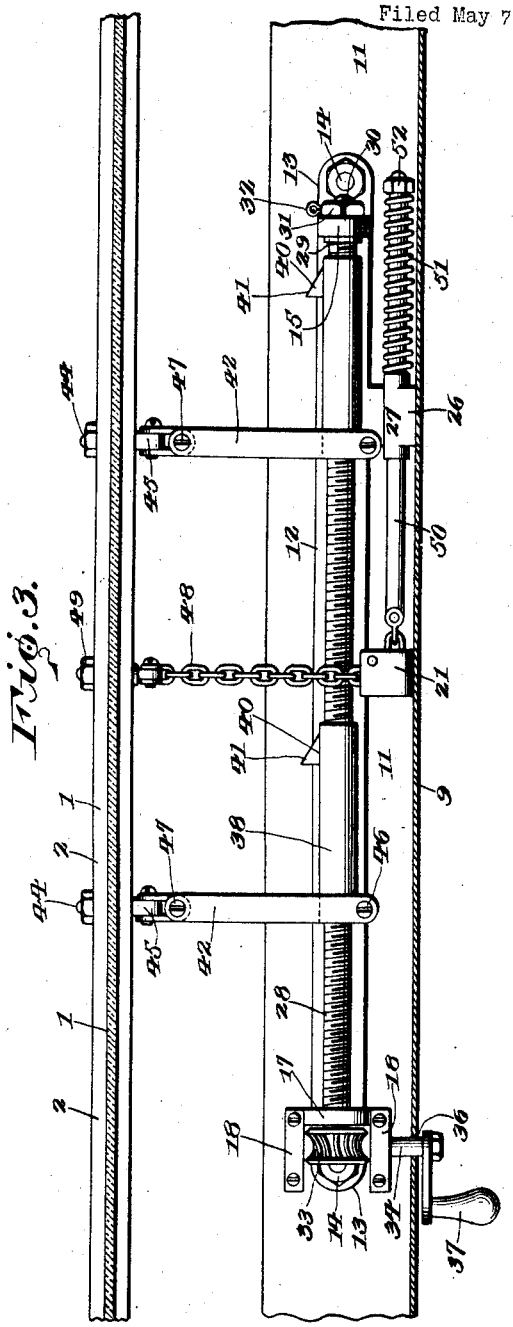
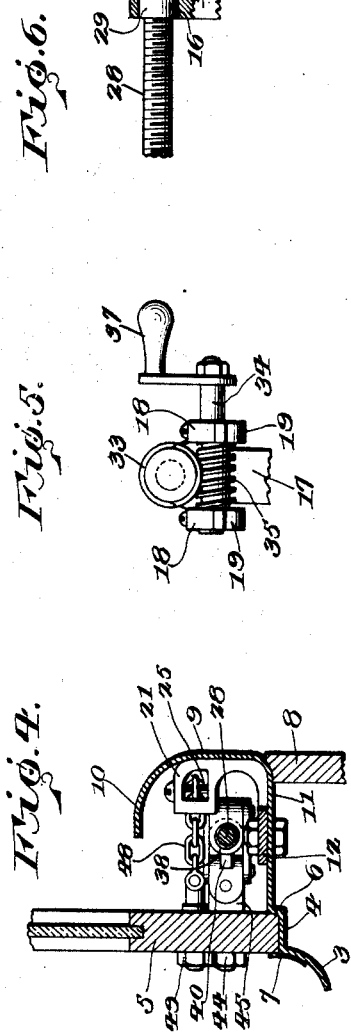
INVENTOR.
Sweney Munson,
BY Geo. F. Kimmel
ATTORNEY.

Patented Feb. 28, 1928.

1,661,047

UNITED STATES PATENT OFFICE.

SWENEY MUNSON, OF SCAMMON, KANSAS.

WINDSHIELD ADJUSTER FOR AUTOMOBILES.

Application filed May 7, 1927. Serial No. 189,665.

This invention relates to an adjuster designed primarily for use in connection with windshields of motor vehicles, but it is to be understood that an adjuster, in accordance with this invention, can be employed in any connection for adjusting for which it is found applicable, and the invention has for its object to provide, in a manner as hereinafter set forth, a device of the class referred to for expeditiously and conveniently adjusting a windshield to the desired extent when occasion requires and further for maintaining the windshield in adjusted positions.

Further objects of the invention are to provide, in a manner as hereinafter set forth an adjusting device for windshields including means to prevent the rattling of the windshield when the latter has been adjusted, as well as to prevent the elements of the device when in normal position and when shifted from normal, from rattling.

A further object of the invention is to provide, in a manner as hereinafter set forth, a device of the class referred to including means, in case of the windshield being stuck when in closed position, acting as a release for the windshield at the start of the operation of the device when the latter is actuated for the purpose of adjusting the windshield to open position.

A further object of the invention is to provide in a manner as hereinafter set forth, an adjuster for expeditiously shifting a windshield from closed to open position and from the latter position to closed position when desired.

Further objects of the invention are to provide, in a manner as hereinafter set forth, an adjuster for the purpose referred to which is simple in its construction and arrangement, strong, durable, compact, readily installed with respect to the windshield and the body of the automobile, thoroughly efficient in its use, spring controlled, including inherent means for maintaining the windshield in closed and in adjusted positions, conveniently operated, and comparatively inexpensive to manufacture.

With the foregoing and other objects in view the invention consists of the novel construction, combination and arrangement of parts, as hereinafter more specifically described and illustrated in the accompanying drawings wherein is shown an embodiment of the invention, but it is to be understood that changes, variations and modifications can be resorted to which fall within the scope of the claims hereunto appended.

In the accompanying drawings wherein like reference characters denote corresponding parts throughout the several views:

Figure 1 is a rear elevation of an adjuster, in accordance with this invention, showing the adaptation thereof with respect to the cowl of a motor vehicle and disconnected from the windshield and with the operating shaft of the adjuster in section and further illustrating the instrument board and with the device or adjuster positioned forwardly with respect to the board.

Figure 2 is a sectional plan of a windshield and cowl and showing the adaptation therewith of an adjuster in accordance with this invention, the adjuster being illustrated in top plan and partly in section and with the windshield closed.

Figure 3 is a top plan view of the adjuster and illustrating the adaptation thereof with respect to the cowl and windshield and with the windshield shifted to open position.

Figure 4 is a section on line 4—4 Figure 2.

Figure 5 is a detail illustrating the operating mechanism for the actuating element for the adjusting elements.

Figure 6 is a fragmentary view illustrating the actuating element for the adjusting elements.

Referring to the drawings in detail 1 denotes the glass or transparent panel of a windshield and 2 the frame in which the glass or panel is mounted. The windshield is pivotally connected to the automobile body in a known manner. The cowl of the automobile is indicated at 3 and is provided with a seat 4 for the lower frame member 5 of the windshield frame 2. The cowl 3 is shouldered as at 6 to provide an abutment for the frame member 5 when the windshield is in closed position. A flexible weather strip 7 is secured to the cowl 3, forwardly of the seat 4 and which when the windshield is in closed position overlaps the bottom frame member 5, see Figure 4. The cowl 3 is extended rearwardly from the shoulder 6 and seats upon the top edge of the instrument board 8. The cowl is then extended upwardly as at 9 and forwardly as at 10 and if desired the forwardly extending portion 10 can abut the windshield frame when the windshield is in closed position. The foregoing structure is of known construction and it is illustrated to show the manner in which the adjuster is set up with respect thereto, and more particularly with respect to the lower or bottom frame member 5 of the windshield frame 2.

The adjuster, in accordance with this invention, is supported by the cowl 3, forwardly of the instrument board 8 and is interposed between the windshield and the upstanding portion 9 of the cowl. In plan the portions 9, 10 of the cowl extend upon an arc as is shown in Figure 1 and which is a known arrangement. That part of the cowl 3 between the shoulder 6 and instrument board 8 is indicated at 11 and is of arcuate curvature. The adjuster, in accordance with this invention is secured to the portion 11 of the cowl, see Figures 1 and 4. The adjuster includes a base member referred to generally by the reference character 12, and which comprises a bar 13 conforming in curvature to the curvature of the portion 11 of the cowl 3. The bar 13 is of substantial length and width and is positioned substantially at the longitudinal median of the part 11. Each end of the bar 13 is fixedly secured to the part 11, by a holdfast device 14, see Figure 3. Extended vertically from the upper face of the bar 13, in proximity to one end thereof is an arm 15, provided at its top with an opening 16 which forms a bearing for one end of an actuating element to be presently referred to. Formed integral with and extending vertically of the bar 13 in proximity to its other end is an apertured arm 17, which also provides a bearing for the adjusting element to be presently referred to. Formed integral with each side of the arm 17, below the top thereof, as well as extending at right angles with respect to said arm 17, is an upper bearing member 18 and each of said bearing members has associated therewith a lower bearing member 19 which is fixedly secured to an upper bearing member 18 by the holdfast devices 20. The bearing members 18 and 19 provide a pair of bearings for the shaft of the operating mechanism, to be presently referred to, for the actuating element. The bearing members 18 and 19 extend outwardly from the arm 17.

Formed integral with the bar 13, approximately centrally thereof, and extending rearwardly therefrom, as well as projecting thereabove, is a guide 21 provided with an opening 22 in one side and an opening 23 in its other side and further provided with an opening 24 in its front. Arranged within the guide 21 is a vertically disposed roller 25. Formed integral with the bar 13, at a point between the guide 21 and the arm 15 is a rearwardly extending combined guide, bearing and abutment element formed of an upstanding arm 26 terminating at its upper end in a tubular head 27 which projects from each side of the arm 26. The purpose of the guide 21 and the combined guide, bearing and abutment will be presently referred to.

Rotatably mounted in the arms 15 and 17 is an actuating element for a plurality of adjusting elements. The adjusting elements will be presently referred to. The actuating element consists of a rotatable shaft 28 having the major portion thereof peripherally threaded. The shaft 28 at the end terminal portion 30 thereof has mounted thereon a sleeve nut comprising a body portion 29 and a head 31. The body portion 29 is mounted in the opening 16 of the arm 15. Extending through the head 31 of the nut and the shaft 30 is a cotter pin 32. The head 31 abuts against the outer side of the arm 15 and it is of greater size than the body portion 29 and by this arrangement the shaft 28 is connected to the arm 15, but rotates therein. The other end of the shaft 28 is journaled in the arm 17 and projects from the outer side thereof and the projecting end of said shaft 28 carries a worm pinion 33.

The operating means for the shaft 28 consists of a worm shaft 34 which is mounted in the pair of bearings formed by the bearing members 18 and 19. The shaft 34 is disposed at right angles with respect to the shaft 28, but arranged below the same, and the worm 35 on the shaft 34 meshes with the worm pinion 33. The shaft 34 extends through an opening 36 formed in the portion 9 of the cowl 3 and carries a handle member 37 for the purpose of manually operating the shaft 34 by an occupant of the automobile when it is desired to adjust the windshield from closed position to open position or from the latter to closed position.

Two adjusting elements are employed and they are arranged in spaced relation. Each adjusting element includes a sleeve 38, a tubular extension 39, a cam piece 40 formed with a bevelled forward edge 41, a pair of links 42, 43, a coupling member 44 and a universal joint connection 45 between the coupling member and the pair of links. The tubular extension 39 is vertically disposed and arranged on the rear side of the sleeve 38 at one end thereof, and the cam piece 40 extends lengthwise of the sleeve 38 and is arranged on the forward side of the sleeve at that end opposite the end on which the extension 39 is formed. The links 42, 43 are pivotally connected to the extension 39, as at 46. The link 42 is arranged above and the link 43 below the sleeve 38 and the pair of links extend across the sleeve from the pivot 46 therefor. As illustrated one of the sleeves 38 has the tubular extension 39 at its outer end and the cam piece 40 at its inner end and the other sleeve 38 has its tubular extension 39 at its inner end and cam piece 40 at its outer end. The cam pieces 40 are of triangular contour and move on the rear pivots 47 of the universal joint connections 45, in case of the windshield being stuck when in closed position, to act as a release for the windshield at the start of the operation of the device for the purpose of adjusting the windshield to open position. The normal position of the adjusting device, that is when the windshield is closed, will be as shown in Figure 2 and when the operating mechanism is operated in one direction it rotates the shaft 28 causing the travelling of the sleeves lengthwise of said shaft 28 and in a direction toward the arm 15 and on the initial shift of the sleeves, the cam pieces engaging the pivots 47, will assist in release of the windshield and further assist in swinging the coupling members forwardly and these latter will carry the links therewith. When the operating mechanism is operated in the other direction the sleeves are returned to normal position.

The adjuster includes an anti-rattling means consisting of a flexible member 48, such as a chain, which is passed through the guide 21 and travels against the roller 25, is positioned above the guides and is connected with the frame of the windshield by a coupling member 49. The forward end of the flexible member 48 is pivotally connected to the rear end of the coupling member 49 and the rear end of the flexible member 48 is attached to one end of a spring controlled slide bar 50 which is slidably mounted in the combined guide and abutment. The slide bar 50 is extended through the tubular head 27 of the combined guide, bearing and abutment. The controlling spring for the slide bar is indicated at 51 and is mounted thereon and interposed between one end of the head 27 and a nut 52 which is mounted on the rod or bar 50 at the other end thereof. The spring 51 also acts as a controlling spring for the other elements of the device when the windshield is shifted outwardly, as such shift is had against the action of the spring 51 and therefore said spring 51 will act as a controlling means for the elements of the device. The spring 51 also acts to maintain the parts of the device from rattling when in normal position.

The threads of the sleeves 38, coact with the threads of the shaft 28 to maintain the windshield in its adjusted position, and the spring 51 also assists in such action.

It is thought the many advantages of an adjuster for the purpose set forth in accordance with this invention can be readily understood, and although the preferred embodiment of the invention is as illustrated and described, yet it is to be understood that changes in the details of construction can be had which will fall within the scope of the invention as claimed.

What I claim is:

1. An adjuster for windshields comprising a plurality of adjusting elements including means for coupling them to the windshield, a rotatable actuating element common to and carrying said adjusting elements, means for rotating said actuating element and each of said adjusting elements provided intermediate its ends with a universal joint connection and with a cam riding against said connection for forcing it from normal position at the start of the actuation of the adjusting element to shift the windshield to open position.

2. An adjuster for windshields comprising a plurality of adjusting elements including means for coupling them to the windshield, a rotatable actuating element common to and carrying said adjusting elements, means for rotating said actuating element, an anti-rattling device for connection with the windshield and including spring controlling means for said elements, and each of said adjusting elements provided intermediate its ends with a universal joint connection and with a cam riding against said connection for forcing it from normal position at the start of the actuation of the adjusting element to shift the windshield to open position.

3. An adjuster for windshields comprising a plurality of adjusting elements including means for coupling them to the windshield, a rotatable actuating element common to and carrying said adjusting elements, means for rotating said actuating element, a support common to said elements and operating means, and each of said adjusting elements provided intermediate its ends with a universal joint connection and a cam riding against said connection for forcing it from normal position at the start of the actuation of the adjusting element to shift the windshield to open position.

4. An adjuster for windshields comprising a plurality of sleeves, a pair of superposed links pivotally connected at the follower end to the follower end of each sleeve, coupling members adapted to be secured to the windshield, universal joint connections between the leading end of each pair of links and a coupling member, each sleeve extending between a pair of links, means carrying and shifting said sleeves in a path at an angle with respect to said links and coupling members to extend the links to adjust the windshield, said means being rotatable and having threaded engagement with the sleeves, and operating means for said rotatable means.

5. An adjuster for windshields comprising a plurality of sleeves, links pivotally connected at one end to each sleeve, coupling members adapted to be secured to the windshield, universal joint connections between the other end of the links and said coupling members, means carrying and shifting said sleeves in a path at an angle with respect to said links and coupling members to extend the links to adjust the windshield, and means carried by said sleeves and riding against said universal joint connections for forcing them from normal position at the start of the operation of said rotatable means.

6. An adjuster for windshields comprising a plurality of sleeves, links pivotally connected at one end to each sleeve, coupling members adapted to be secured to the windshield, universal joint connections between the other end of the links and said coupling members, means carrying and shifting said sleeves in a path at an angle with respect to said links and coupling members to extend the links to adjust the windshield, said means being rotatable and having threaded engagement with the sleeves, operating means for said rotatable means, and means carried by said sleeves and riding against said universal joint connections for forcing them from normal positions at the start of the operation of said rotatable means.

7. An adjuster for windshields comprising a plurality of sleeves, links pivotally connected at one end to each sleeve, coupling members adapted to be secured to the windshield, universal joint connections between the other end of the links and said coupling members, means carrying and shifting said sleeves in a path at an angle with respect to said links and coupling members to extend the links to adjust the windshield, means carried by said sleeves and riding against said universal joint connections for forcing them from normal position at the start of the operation of said rotatable means, and an anti-rattling device for connection to the windshield and including a spring controlling means therefor and for said sleeves and rotatable means.

8. An adjuster for windshields comprising a plurality of sleeves, links pivotally connected at one end to each sleeve, coupling members adapted to be secured to the windshield, universal joint connections between the other end of the links and said coupling members, means carrying and shifting said sleeves in a path at an angle with respect to said links and coupling members to extend the links to adjust the windshield, said means being rotatable and having threaded engagement with the sleeves, operating means for said rotatable means, means carried by said sleeves and riding against said universal joint connections for forcing them from normal positions at the start of the operation of said rotatable means, and an anti-rattling device for connection to the windshield and including a spring controlling means therefor and for said sleeves and rotatable means.

9. An adjuster for windshields comprising a plurality of sleeves, links pivotally connected at one end to each sleeve, coupling members adapted to be secured to the windshield, universal joint connections between the other end of the links and said coupling members, means carrying and shifting said sleeves in a path at an angle with respect to said links and coupling members to extend the links to adjust the windshield, means carried by said sleeves and riding against said universal joint connections for forcing them from normal position at the start of the operation of said rotatable means, an anti-rattling device for connection to the windshield and including a spring controlling means therefor and for said sleeves and rotatable means, and a support common to said sleeve shifting means and said anti-rattling device.

10. An adjuster for windshields comprising a plurality of sleeves, links pivotally connected at one end to each sleeve, coupling members adapted to be secured to the windshield, universal joint connections between the other end of the links and said coupling members, means carrying and shifting said sleeves in a path at an angle with respect to said links and coupling members to extend the links to adjust the windshield, said means being rotatable and having threaded engagement with the sleeves, operating means for said rotatable means, means carried by said sleeves and riding against said universal joint connections for forcing them from normal positions at the start of the operation of said rotatable means, an anti-rattling device for connection to the windshield and including a spring controlling means therefor and for said sleeves and rotatable means, and a support common to said sleeve shifting means and said anti-rattling device.

11. In a windshield adjuster, an adjusting element for the windshield comprising a lengthwise shiftable sleeve, a coupling member adapted to be attached to the windshield, link means pivotally attached at one end with one end of said sleeve, a pivotal connection between said member and the other end of said link means and bearing against said sleeve when the adjusting element is in normal position, and a cam piece carried by the sleeve and riding against said pivotal connection on the shifting of the sleeve for forcing said element from normal position at the start of the shift of the sleeve.

12. In a windshield adjuster, an adjusting element for the windshield comprising a lengthwise shiftable sleeve, a coupling member adapted to be attached to the windshield, link means pivotally attached at one end with one end of said sleeve, a pivotal connection between said member and the other end of said link means and bearing against said sleeve when the adjusting element is in normal position, and a cam piece carried by the sleeve and riding against said pivotal connection on the shifting of the sleeve for forcing said element from normal position at the start of the shift of the sleeve, said cam piece of triangular contour and positioned at one end of the sleeve.

13. An adjuster for windshields comprising adjusting elements including coupling members for attaching them to the windshield, a rotatable actuating element common to and carrying said adjusting elements, means for rotating said actuating element to provide for the shifting of said adjusting elements, and each of said adjusting elements having a universal joint connection intermediate its ends and further having intermediate its ends means riding against said universal joint connection for forcing it from normal position at the start of the actuation of the adjusting elements to shift the windshield to open position.

In testimony whereof, I affix my signature hereto.

SWENEY MUNSON.